United States Patent
Qu et al.

(10) Patent No.: US 11,645,316 B2
(45) Date of Patent: May 9, 2023

(54) QUESTION ANSWERING METHOD AND LANGUAGE MODEL TRAINING METHOD, APPARATUS, DEVICE, AND STORAGE MEDIUM

(71) Applicant: BEIJING BAIDU NETCOM SCIENCE TECHNOLOGY CO., LTD., Beijing (CN)

(72) Inventors: Yingqi Qu, Beijing (CN); Jing Liu, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 211 days.

(21) Appl. No.: 17/088,053

(22) Filed: Nov. 3, 2020

(65) Prior Publication Data

US 2021/0191962 A1 Jun. 24, 2021

(30) Foreign Application Priority Data

May 27, 2020 (CN) .......................... 202010460778.6

(51) Int. Cl.
*G06F 16/33* (2019.01)
*G06F 16/332* (2019.01)
(Continued)

(52) U.S. Cl.
CPC ........ *G06F 16/3346* (2019.01); *G06F 16/338* (2019.01); *G06F 16/3329* (2019.01);
(Continued)

(58) Field of Classification Search
CPC ............. G06F 16/3346; G06F 16/3329; G06F 16/3344; G06F 16/3347; G06F 16/338
See application file for complete search history.

(56) References Cited

U.S. PATENT DOCUMENTS 8,645,122 B1 2/2014 DiFabbrizio et al.
2007/0112734 A1* 5/2007 Xin .................. G06F 16/951
707/E17.08
(Continued)

FOREIGN PATENT DOCUMENTS

CN 110737755 A 1/2020
CN 110955761 A 4/2020

OTHER PUBLICATIONS

Zhang, Shuo et al., Ad Hoc Table Retrieval using Semantic Similarity, Arxiv.org, Cornell University Library, Feb. 2018, pp. 1-10.
(Continued)

*Primary Examiner* — Richard L Bowen
*Assistant Examiner* — Aryan D Toughiry
(74) *Attorney, Agent, or Firm* — Dilworth IP, LLC

(57) ABSTRACT

Provided are a question answering method and language model training method, apparatus, device, and storage media, including: acquiring at least one candidate table matching a question to be queried, each candidate table includes a candidate answer corresponding to the question; processing the at least one candidate table to obtain at least one table text, the table text includes textual content of respective fields in the candidate table; inputting the question and each table text into a preset language model respectively to obtain a degree of matching between the question and each candidate table; and outputting a reply table according to the degree of matching of each candidate table, the reply table is a candidate table out of the at least one candidate table whose degree of matching with the question is greater than a preset value or a candidate table that corresponds to a maximum degree of matching.

14 Claims, 6 Drawing Sheets

(51) Int. Cl.
*G06F 16/338* (2019.01)
*G06N 3/08* (2023.01)

(52) U.S. Cl.
CPC ...... *G06F 16/3344* (2019.01); *G06F 16/3347* (2019.01); *G06N 3/08* (2013.01)

(56) References Cited

U.S. PATENT DOCUMENTS

| | | |
|---|---|---|
| 2015/0293917 A1 | 10/2015 | Bufe, III et al. |
| 2016/0012052 A1* | 1/2016 | Zoryn ............... G06F 16/24578 707/728 |
| 2019/0102437 A1* | 4/2019 | Patthak ............... G06F 16/2453 |
| 2019/0171704 A1 | 6/2019 | Buisson et al. |
| 2019/0260694 A1 | 8/2019 | Londhe et al. |
| 2019/0278846 A1* | 9/2019 | Xiang ..................... G06N 3/08 |
| 2020/0004875 A1* | 1/2020 | McAteer ............. G06F 16/3334 |
| 2020/0202257 A1* | 6/2020 | Lee ..................... G06K 9/6263 |

OTHER PUBLICATIONS

Anonymous, Language Model, Wikipedia, Feb. 2018, pp. 1-5.
European Search Report in EP Patent Application No. 21155777.2 dated Apr. 6, 2021.
First Office Action in JP Patent Application No. 2020-215253 dated Sep. 29, 2021.
Wu, Shao-hong et al., MGSC: a Multi-granularity Semantic Cross Model for Matching Short Texts, Journal of Chinese Computer Systems, 2019, vol. 40, No. 6, pp. 1148-1152.
First Office Action in CN Patent Application No. 202010460778.6 dated Mar. 4, 2023.

* cited by examiner

Futures Trading Fee. Exchange Commodity Commodity Code Trading Fee (per lot). Exchange A Commodity A IC 0.23/10000 of transaction amount Commodity B IF 0.23/10000 of transaction amount Commodity C IH 0.23/10000 of transaction amount Commodity D T 3 yuan Commodity E TF 3 yuan

FIG. 3A

Division of zodiac signs - Baidu

All   Video   QA   Image   Tieba   Wenku

Classification timeline

| Symbol | Zodiac Sign | Latin name | Date of birth (solar calendar) |
|---|---|---|---|
|  | Baiyang | Aries | March 21-April 19 |
|  | Jinniu | Taurus | April 20-May 20 |
|  | Shuangzi | Gemini | May 21-June 21 |
|  | Juxie | Cancer | June 22-July 22 |
|  | Shizi | Leo | July 23-August 22 |
|  | Chunv | Virgo | Agugst 23-September 22 |
|  | Tiancheng | Libra | September 23-October 23 |
|  | Tianxie | Scorpio | October 24-November 22 | zodiac signs
baike.baidu.com

QUESTION ANSWERING METHOD AND LANGUAGE MODEL TRAINING METHOD, APPARATUS, DEVICE, AND STORAGE MEDIUM

CROSS-REFERENCE TO RELATED APPLICATION

This application claims priority to Chinese Patent Application No. 202010460778.6, filed on May 27, 2020, which is hereby incorporated by reference in its entirety.

TECHNICAL FIELD

Embodiments of the present application relate to natural language processing technologies in data processing and, in particular, to a question answering method and language model training method, apparatus, device, and storage medium.

BACKGROUND

The question answering system (Question Answering System, QA) is an advanced form of information retrieval system, which can answer questions raised by users in natural language by using accurate and concise natural language, and provide personalized services for the users. When the question answering system is answering a user's question, one of the ways is to match a structured answer for the question, such as an answer in a form of table, while how to get the table corresponding to the question is a major difficulty at present.

Currently, the question answering system obtains a corresponding answer in a form of table mainly by processing information of fields in the table (including a title, a header, a table cell, a context, etc.), and then text-matching the information of the fields in the table with the question. However, the matched answer obtained in this way has a problem of low accuracy.

SUMMARY

The present application provides a question answering method and language model training method, apparatus, device, and storage medium.

According to an aspect of the present application, provided is a question answering method, including:

acquiring at least one candidate table matching a question to be queried, where each candidate table includes a candidate answer corresponding to the question;

processing the at least one candidate table to obtain at least one table text, where the table text includes textual content of respective fields in the candidate table, and the fields include a title, a header and a cell;

inputting the question and each table text into a preset language model respectively to obtain a degree of matching between the question and each candidate table; and outputting a reply table according to the degree of matching of each candidate table, where the reply table is a candidate table out of the at least one candidate table whose degree of matching with the question is greater than a preset value or a candidate table whose degree of matching with the question is maximum.

According another aspect of the present application, provided is a language model training method, including:

acquiring first training sample data, where the first training sample data is textual data without labeling information; performing, based on the first training sample data, first pre-training on a model to be trained to obtain a first pre-training model;

acquiring second training sample data and labeling information corresponding thereto, where the second training sample data includes a question and multiple candidate tables corresponding to the question, and the labeling information is configured to indicate a correlation between the question and each candidate table; and training the first pre-training model based on the second training sample data and the labeling information corresponding thereto to obtain a language model, where the language model is configured to determine a degree of matching between the question and at least one candidate table.

According another aspect of the present application, provided is a question answering apparatus, including:

a first acquiring module, configured to acquire at least one candidate table matching a question to be queried, where each candidate table includes a candidate answer corresponding to the question;

a table processing module, configured to process the at least one candidate table to obtain at least one table text, where the table text includes textual content of respective fields in the candidate table, and the fields include a title, a header and a cell;

a determining module, configured to input the question and each table text into a preset language model respectively to obtain a degree of matching between the question and each candidate table; and an outputting module, configured to output a reply table according to the degree of matching of each candidate table, where the reply table is a candidate table out of the at least one candidate table whose degree of matching with the question is greater than a preset value or a candidate table whose degree of matching with the question is maximum.

According another aspect of the present application, provided is a language model training apparatus, including:

a second acquiring module, configured to acquire first training sample data, where the first training sample data is textual data without labeling information; and acquire second training sample data and labeling information corresponding thereto, where the second training sample data includes a question and multiple candidate tables corresponding to the question, and the labeling information is configured to indicate a correlation between the question and each candidate table; and a training module, configured to perform, based on the first training sample data, first pre-training on a model to be trained to obtain a first pre-training model; and train the first pre-training model based on the second training sample data and the labeling information corresponding thereto to obtain a language model, where the language model is configured to determine a degree of matching between the question and at least one candidate table.

According another aspect of the present application, provided is an electronic device, including:

at least one processor; and a memory communicatively connected to the at least one processor;

where the memory is stored with an instruction executable by the at least one processor, and the instruction is executed by the at least one processor to enable the at least one processor to execute the method according to the first aspect and/or the second aspect.

According another aspect of the present application, provided is a non-transitory computer readable storage medium stored with a computer instruction, where the computer instruction is configured to enable a computer to execute the method according to any one of the first aspect and/or the second aspect.

According another aspect of the present application, provided is a question answering method, including:

acquiring at least one candidate table matching a question to be queried, where each candidate table includes a candidate answer corresponding to the question;

inputting the question and each candidate table into a preset language model respectively to obtain a degree of matching between the question and each candidate table; and outputting a candidate table out of the at least one candidate table whose degree of matching with the question is greater than a preset value or a candidate table whose degree of matching with the question is maximum.

The technology according to the present application improves the accuracy and recall rate of matching between the question and the table.

It should be understood that the content described in this section is not intended to identify a key or important feature in the embodiments of present application, nor is it intended to limit the scope of the present application. Other features of the present application will become readily comprehensible with the following description.

BRIEF DESCRIPTION OF DRAWINGS

The accompanying drawings are used to better understand the solution, but do not constitute a limitation to the present application. Among them:

FIG. 3A is a schematic diagram of a table text according to an embodiment of the present application;

FIG. 3B is a schematic diagram of a final output reply table according to an embodiment of the present application;

DESCRIPTION OF EMBODIMENTS

Exemplary embodiments of the present application will be described hereunder with reference to the accompanying drawings, which include therein various details of the embodiments of the present application to facilitate understanding, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

Figure 1:
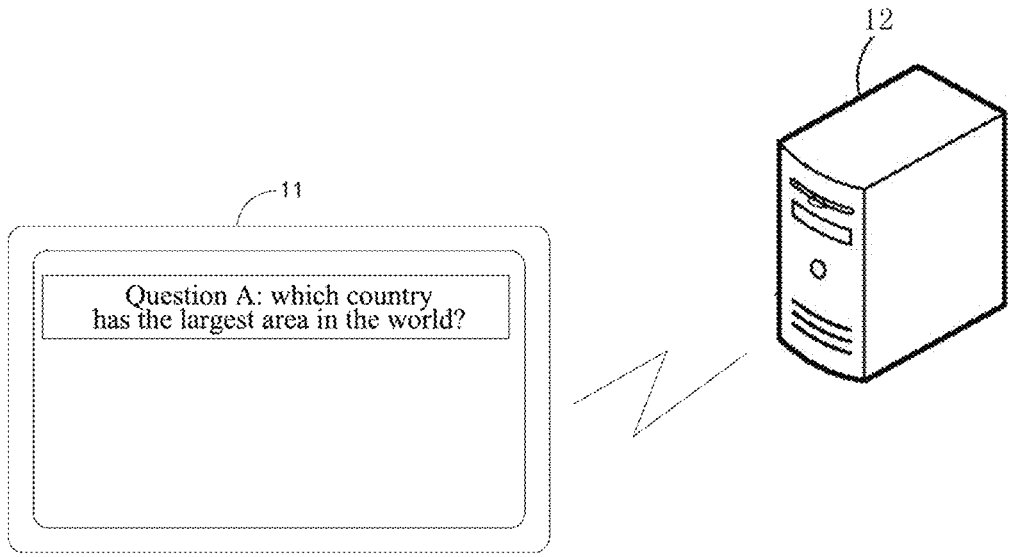
FIG. 1 is a schematic diagram of an application scenario according to an embodiment of the present application.

FIG. 1 is a diagram of an application scenario according to an embodiment of the present application. As shown in FIG. 1, the application scenario includes: a terminal device 11 and a server 12, where the terminal device 11 may be an electronic device such as a smart phone, an ipad, and a computer; and the server 12 has a correspondence between a question and an answer stored therein. Optionally, the answer includes a structured answer and an unstructured answer. In the embodiments of the present application, the structured answer refers to an answer presented in a form of table, and the unstructured answer mainly refers to an answer presented in a form of text; among them, the structured answer is more intuitive and vivid than the unstructured text answer with regard to questions such as "parameter configuration for mobile phone model A" and "ranking of territorial areas of countries in the world", since these questions can be answered directly in tables. In addition, there is also a situation that part of content in a table is used as an answer to a question, such as: "what about the pixels of the front camera of the mobile phone model B" and "the territorial area of the largest country in the world", answers to these questions exist in structured tables, similar to knowledge base question answering, the location of the answer needs to be further determined based on the fact that the table matching the question is found.

At present, most of the existing question answering systems are oriented to unstructured text, that is, accurate answers to questions are obtained through techniques such as question matching, paragraph retrieval, and machine reading comprehension. However, as a matter of fact, structured tables also contain large amounts of information, which can also be used as a source of answers. Therefore, some people have gradually begun to study how to match a question with a table.

At present, a main method is to split a table into different fields (a title, a header, a table cell, a context, etc.), and extract a matching feature between the question and respective fields of the table, including similarity features (such as BM25, edit distance, Jaccard similarity, etc.), literal matching features (whether a word in the question appears in the respective fields of the table, what about the proportion of appearance, etc.). Then, based on these features, a classification model is trained to determine whether the question is correlated with the table or not. This method focuses on literal matching information between the question and the respective fields of the table. Therefore, the accuracy and recall rate of answer matching are not high.

In addition, for a table question answering system in a search scenario, it directly removes structured information of the table, uses the table as a text paragraph, and uses the same method as the text for recall; or it directly discards this part of answer information without presenting a form of table, which has poor visualization and affects user experience.

In light of the above technical problem, the embodiments of the present application not only focus on literal matching, but also focus more on semantic matching between a question and at least one candidate table matching the question, thereby capable of improving the accuracy and recall rate of answer matching. In addition, the answer is finally presented to users in the form of table, which has good visualization for the users and thus can improve user experience.

Detailed description will be made hereunder with specific embodiments in respect of technical solutions of the present application and how to solve the above technical problem according to the technical solutions of the present application. The following specific embodiments can be combined with each other, and for the same or similar concept or process, details may not be described again in some embodiments. The embodiments of the present application will be described hereunder in conjunction with the accompanying drawings.

Figure 2:
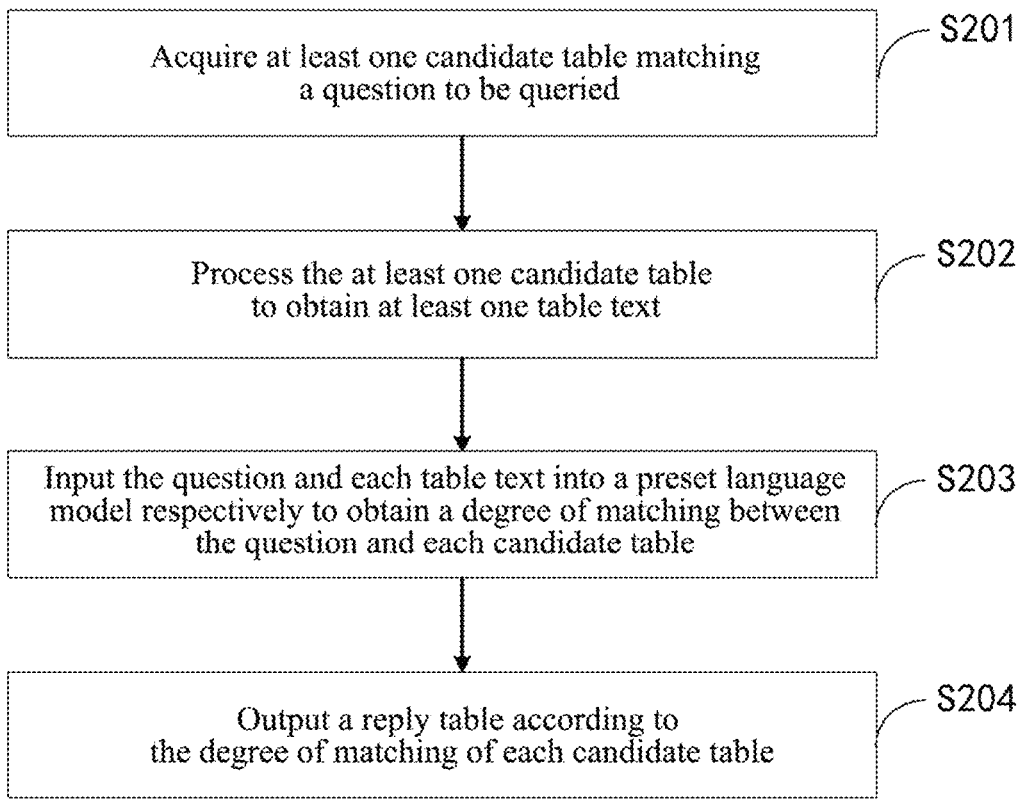
FIG. 2 is a flowchart of a question answering method according to an embodiment of the present application.

FIG. 2 is a flowchart of a question answering method according to an embodiment of the present application. For the above technical problem in the prior art, a question answering method is provided in an embodiment of the present application, and the method has the following specific steps:

Step 201, acquire at least one candidate table matching a question to be queried.

For a question to be queried, there may be no matching candidate table, or it may correspond to one candidate table or at least two candidate tables. The present embodiment mainly focuses on a situation where one question corresponds to one candidate table or at least two candidate tables. Each candidate table includes a candidate answer corresponding to the question. Optionally, the candidate answer may be all or part of content in each candidate table.

The execution subject of the present embodiment may be a terminal device. In Step 201, at least two tables matching the question to be queried are acquired by the terminal device from a server. Taking a search scenario as an example, a user inputs a question to be queried on the terminal device, the terminal device generates a search request immediately according to the question to be queried, and then sends it to the server; the server matches a corresponding answer for the question to be queried and then returns it to the terminal device. It is worth noting that the embodiment of the present application mainly focuses on matching a question with an answer in a form of table, unless otherwise specified, the answer mentioned below refers to the answer in the form of table.

Optionally, the server may use a crawling tool to obtain the candidate table in the process of matching the corresponding answer for the question to be queried.

Step 202, process the at least one candidate table to obtain at least one table text.

In the present embodiment, each candidate table is processed separately to obtain a table text corresponding to the candidate table, that is, each candidate table corresponds to one table text.

The table text includes textual content of respective fields in the candidate table, and the fields of the table include a title, a header and a cell; the table text includes at least one paragraph, each paragraph includes at least one sentence, each sentence includes at least one word, each word corresponds to field information, the field information is configured to indicate a field to which the word in the text belongs in the table, and the field includes the title, the header and the cell.

As shown in Table 1 below, it is an exemplary table. In the table, "Futures Trading Fee" is a title, "Exchange", "Commodity", "Commodity Code", "Trading Fee (per lot)" are headers, and the remainders are cells. After the above-mentioned table is converted into a text, as shown in FIG. 3A, it is presented in a form of text.

TABLE 1

Title: Futures Trading Fee

| Exchange | Commodity | Commodity Code | Trading Fee (per lot) |
|---|---|---|---|
| Exchange A | Commodity A | IC | 0.23/10000 of transaction amount |
| | Commodity B | IF | 0.23/10000 of transaction amount |
| | Commodity C | IH | 0.23/10000 of transaction amount |
| | Commodity D | T | 3 yuan |
| | Commodity E | TF | 3 yuan |

Step 203, input the question and each table text into a preset language model respectively to obtain a degree of matching between the question and each candidate table.

For one question, it often corresponds to at least one answer. While a degree of matching between the answer and the question determines accuracy of the matching.

For a situation where one question corresponds to one table text, in the present embodiment, the question and the table text can be inputted into a preset language model at one time. While for a situation of one question and at least two table texts, in the present embodiment, the question and the at least two table texts corresponding to the question are inputted into the preset language model multiple times. For example, if Question A corresponds to Table Text A1 and Table Text A2, first input Question A and Table Text A1 into the preset language model, and then input Question A and Table Text A2 into the preset language model.

The language model in the present embodiment can carry out semantic comprehension of a question and a table text respectively so as to determine a degree of matching between the question and the table text based on a semantic comprehension result, that is, the degree of matching between the question and the candidate table. Compared with the prior art, in the matching process, it not only focuses on literal matching, but also focuses on semantic matching. For example, not only a table having the same word can be matched, but also a table having a similar meaning can be matched.

Step 204, output a reply table according to the degree of matching of each candidate table.

The reply table is a candidate table out of the at least one candidate table whose degree of matching with the question is greater than a preset value or a candidate table whose degree of matching with the question is maximum. The final output reply table is shown in FIG. 3B.

An embodiment of the present application allows for: acquiring at least one candidate table matching a question to be queried, where each candidate table includes a candidate answer corresponding to the question; processing the at least one candidate table to obtain at least one table text, where the table text includes textual content of respective fields in the candidate table, and the fields include a title, a header and a cell; inputting the question and each table text into a preset language model respectively to obtain a degree of matching between the question and each candidate table; and outputting a reply table according to the degree of matching of each candidate table, where the reply table is a candidate table out of the at least one candidate table whose degree of matching with the question is greater than a preset value or a candidate table whose degree of matching with the question is maximum. Since the language model can carry out semantic comprehension of a question and a text, in the process of determining the degree of matching between the question and the candidate table, they two are matched based on a semantic comprehension result, thereby improving the accuracy and recall rate of matching between the question and the table. In addition, the answer is finally presented to users in the form of table, which has good visualization for the users and thus can improve user experience.

Before the candidate table is inputted into the language model, the candidate table needs to be processed into a data input form suitable for the language model, that is, text. Introduction will be made hereunder to a specific implementation process with regard to how to process the at least one candidate table to obtain the at least one table text.

In an optional implementation, the textual content of the respective fields in the at least one candidate table may be extracted respectively, and then textual content of respective fields of each candidate table is spliced together to obtain the at least one table text. For each candidate table, textual content of the fields such as a title, a header and a cell in the candidate table is extracted, and then the extracted textual content of the fields such as the title, the header and the cell is spliced together to obtain the table text of the candidate table. Optionally, during the splicing process, the content of the respective fields may be spliced together in order of the title, the header and the cell. For the table text obtained from the splicing, reference may be made to FIG. 3A.

In order to enable the language model to recognize importance of content of different fields for the question, more attention is paid to matching of the question with this part of content. In the present embodiment, on the basis of inputting the table text including the content of the respective fields into the language model, field information can also be added, that is, field information is added to each word in the table text, and inputted to the language model. The field information is configured to identify a field to which the word in the table text belongs in the candidate table, that is, the field information is configured to identify from which field of the candidate table each word in the table text comes, for example, from the title, the header, or the cell.

The language model in the present embodiment may be a neural network, which includes an input layer, a hidden layer and an output layer; on the basis that each word in the table text corresponds to field information, the language model in the present embodiment also needs to improve the input layer so that it can perform coding on the field information. For structures of the hidden layer and the output layer, reference may be made to introduction of the prior art, and details will not be described here again. The following will focus on introduction of the input layer.

Figure 4:
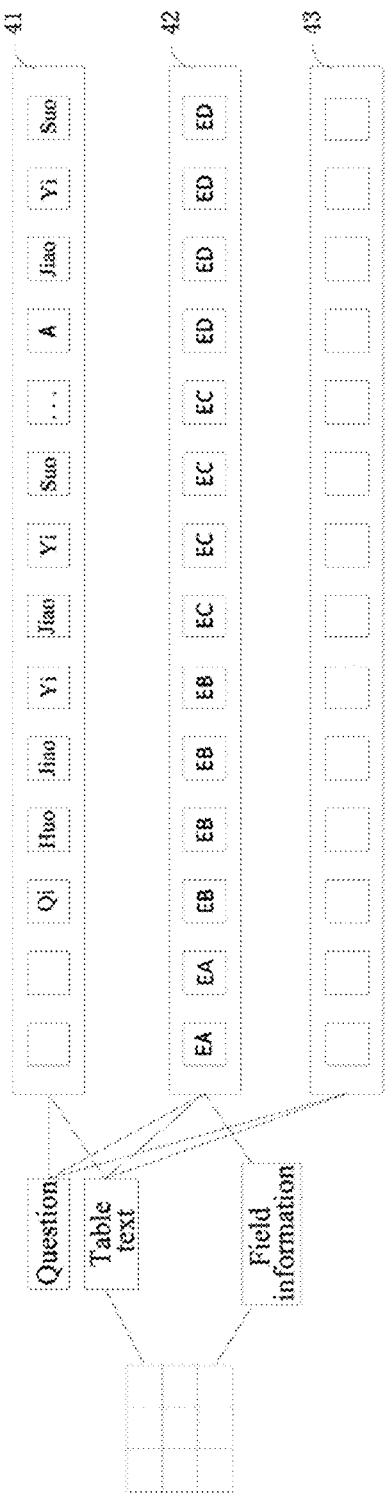
FIG. 4 is a schematic structural diagram of a language model according to an embodiment of the present application.

As shown in FIG. 4, the input layer includes a vector coding module 41, a segment coding module 42 and a position coding module 43; where EA, EB, EC and ED in the segment coding module 42 represent that the character or word comes from the question, the title, the table and the cell respectively; two spaces in the vector coding module 41 represent texts corresponding to the question; and all spaces in the position coding module 43 represent position vectors obtained by coding the texts and the table texts corresponding to the question. For the input layer, input data thereof is a total text including the question and the table texts. In inputting data to the input layer, the total text can be input into the input layer in order of the question and the table texts.

The vector coding module 41 is configured to perform vector coding on each character in the total text; the segment coding module 42 is configured to segment the total text, that is, to identify the preceding words and the following words in the total text; and the position coding module 43 is configured to perform coding on a position of each word in the total text.

Input the question and the table text into a preset language model respectively to obtain a degree of matching between the question and the candidate table, including:

Step a1, input the question and each table text into the vector coding module to obtain a text vector;

Step a2, input the question, each table text and the field information corresponding to the table text into the segment coding module to obtain a segment vector;

Step a3, input the question and each table text into the position coding module to obtain a position vector; and Step a4, determine the degree of matching between the question and each candidate table according to the text vector, the segment vector and the position vector.

In the present embodiment, for a specific implementation process with regard to how the vector coding module and the position coding module perform vector coding and position coding respectively, reference may be made to the introduction of the prior art, and details will not be described here again. The difference of the present embodiment is that the input to the segment coding module includes not only the total text, but also the field information of the table text, so that the segment coding module also performs coding on the field information of the table text in the segment coding process. That is to say, the segment vector in the present embodiment includes a vector obtained by coding the question, the table text and the field information corresponding to the table text. Then, the text vector, the segment vector and the position vector are input into the hidden layer to determine the degree of matching between the question and the candidate table, and finally the degree of matching between the question and each candidate table is output through the output layer.

Optionally, for the input layer, a question and a table text are input each time; for the output layer, in respect of a question and a corresponding candidate table, the final output is a value distributed between 0 and 1. If the value is greater than or equal to a preset threshold, it is considered that the question is correlated with the table; if the value is less than the preset threshold, it is considered that the question is uncorrelated with the table. For example, in a case where the preset threshold is 0.6, if the output layer has an output of 0.4 for a certain question and a corresponding candidate table, it is considered that the question is uncorrelated with the candidate table; if the output layer has an output of 0.8 for a certain question and a corresponding candidate table, it is considered that the question is correlated with the candidate table.

The value output from the output layer may be regarded as a probability value, which is configured to indicate a correlation between a question and a candidate table. According to the probability value, a degree of matching between the question and the candidate table may be determined. The degree of matching may be indicated directly with the probability value, or with a value proportional to the probability value, regardless of either way, the degree of matching is positively correlated with the probability value.

In some cases, a title of a table can represent overall information of the table, therefore, for such candidate tables, the language model will pay more attention to matching of the question with the title part; in other cases, the question needs to be answered with content in a header or a table cell, then the language model will also focus on matching of the question and the header or the table cell. In the present embodiment, by means of adding field information and distinguishing the three fields at a coding input level, judgment and comprehension of the language model for semantic information of the table are improved. In addition, even if certain uninterested field information in the table is lost, the judgment of the language model will not be affected.

In the search scenario, in order to avoid useless retrieval, some questions may be filtered out in advance. Before acquiring at least one candidate table matching a question to be queried, the method in the present embodiment also includes:

Step b1, receive the question to be queried.

The terminal device receives the question to be queried input by the user on the terminal device.

Step b2, determine an answer category of the question to be queried.

The terminal device may pre-determine an answer category of the question to be queried, and filter out some questions irrelevant to the question answering in the table so as to avoid useless retrieval.

Step b3, if the answer category is a target category, acquire the candidate table matching the question to be queried.

The target category includes an entity and/or a number, where the entity includes an object. For the present embodiment, it mainly directs at a question whose answer is an exact answer rather than a selective or interrogative answer. For example, the exact answer means that: for the question about "the country has the largest area in the world", the answer is "country A".

For a case where there is one candidate table, output a reply table according to the degree of matching of each candidate table, including:

Step c1, determine whether the degree of matching of the candidate table is greater than or equal to a matching degree threshold; and Step c2, if the degree of matching of the candidate table is greater than or equal to the matching degree threshold, output the candidate table as the reply table.

Optionally, further included is Step c3, if the degree of matching of the candidate table is less than the matching degree threshold, output a prompt message indicating a failure to search a matched answer.

For a case where there are at least two candidate tables, output a reply table according to the degree of matching of each candidate table, including: output a candidate table corresponding to a highest degree of matching as the reply table.

For example, if a question corresponds to an answer, it can be determined whether to output the answer according to the preset matching degree threshold and the matching degree obtained in Step 203. Exemplarily, if the degree of matching between the question and the answer is greater than or equal to the matching degree threshold, the answer is output in a form of table; if the degree of matching between the question and the answer is less than the matching degree threshold, it may choose not to output the answer, but output a prompt message indicating a failure to find an relevant answer.

If a question corresponds to at least two answers, a candidate table corresponding to the highest degree of matching may be output. With continued reference to FIG. 3B, for example, the candidate table is displayed on the terminal device.

Optionally, the question answering method in the present embodiment can be applied to an offline question answering scenario, and can also be applied to an online question answering scenario.

Figure 5:
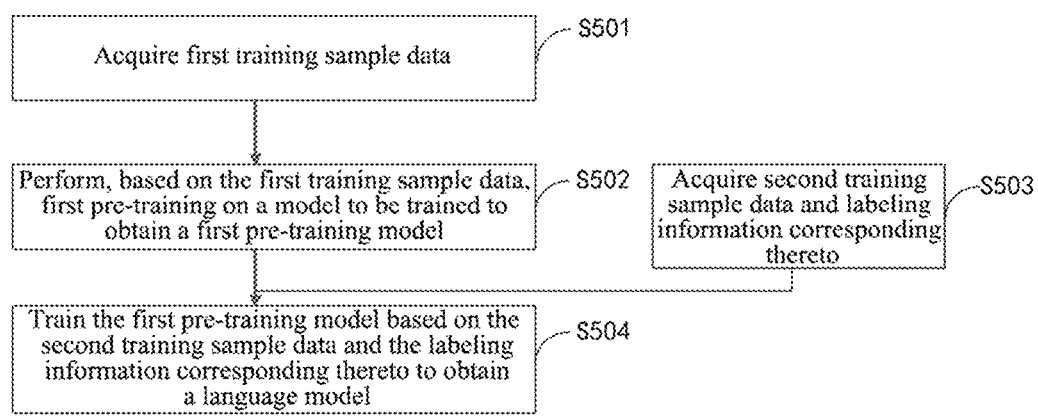
FIG. 5 is a flowchart of a language model training method according to an embodiment of the present application.

In the foregoing embodiment, an application process of the language model is described. In another embodiment of the present application, a language model training method is further provided, as shown in FIG. 5, which includes the following steps:

Step 501, acquire first training sample data.

The first training sample data is textual data without labeling information.

Step 502, perform, based on the first training sample data, first pre-training on a model to be trained to obtain a first pre-training model.

The above two steps refer to pre-training of the language model with a large amount of textual data without labeling information. Optionally, an open source pre-training language model ERNIE may be used in this step.

Step 503, acquire second training sample data and labeling information corresponding thereto.

The second training sample data includes a question and multiple candidate tables corresponding to the question, and the labeling information is configured to indicate a correlation between the question and each candidate table. The correlation between the question and each candidate table means whether the candidate table is correlated with the question.

Step 504, train the first pre-training model based on the second training sample data and the labeling information corresponding thereto to obtain the language model.

In the present embodiment, the language model obtained from the training is configured to determine a degree of matching between the question and at least one candidate table. For a specific application process, reference may be made to the introduction of the embodiment part of the question answering method, and details will not be described here again.

Step 504 is to fine-tune the first pre-training model with a small amount of training sample data with labeling information. The second training sample data is a question-candidate table pair (including a question and a candidate table), and labeling information thereof is artificially judged for correlation and given. Optionally, 0 and 1 may be used to indicate that the question is uncorrelated with the candidate table and correlated with the candidate table, respectively. The labeling information in this step is artificially given, so the training has higher accuracy than the pre-training.

It should be noted that the large amount and the small amount in the present embodiment are relative terms.

On the basis of the embodiment of the above training method, before the first pre-training model is trained based on the second training sample data and the labeling information corresponding thereto to obtain the language model, the method in the present embodiment further includes:

Step 505, acquire third training sample data and labeling information corresponding thereto.

The third training sample data includes a question and multiple textual answers corresponding to the question, the labeling information of the third training sample data is configured to indicate a correlation between the question and the multiple textual answers with labeling information of each textual answer having a different degree of accuracy, and the third training sample data and the second training sample data have a same training task corresponding thereto.

Figure 6:
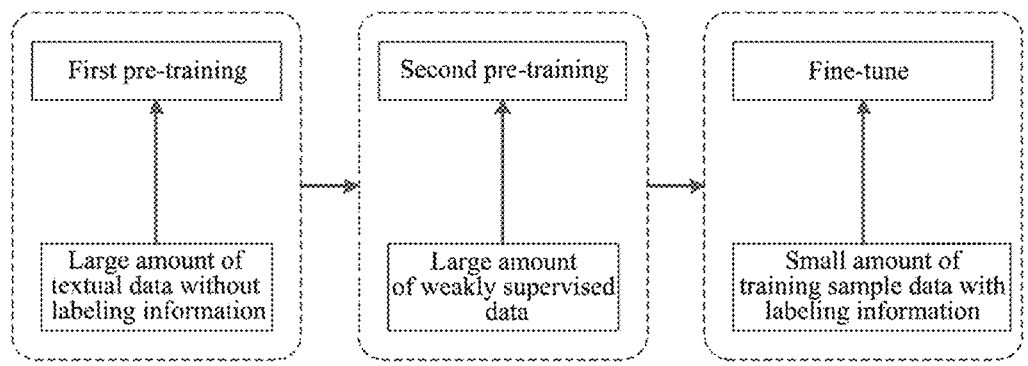
FIG. 6 is a schematic diagram of a language model training method according to another embodiment of the present application.

As shown in FIG. 6, this step is to perform second pre-training with a large amount of weakly supervised data (that is, the third training sample data), which aims to enable the language model to achieve better performance on a specific downstream task. The weakly supervised data uses data about a question and a paragraph matching the question. Optionally, the question is generated based on the paragraph on the website, thereby obtaining a large amount of question-paragraph pairs. It is worth noting that the training tasks corresponding to the question-paragraph pairs here are tasks the same as a target training task. That is to say, the target training task is a task of matching between the question and the table, then a paragraph in the question-paragraph pairs should also be a paragraph which is formed based on the table. For a specific way of forming the paragraph based on the table, reference may be made to the process of generating the table text based on the table in the present embodiment, and details will not be described again in the present embodiment.

Step 506, perform, based on the third training sample data and the labeling information corresponding thereto, second pre-training on the first pre-training model to obtain a retrained first pre-training model.

The retrained first pre-training model is applied again in Step 504, that is, train the retrained first pre-training model based on the second training sample data and the labeling information corresponding thereto to obtain the language model.

In the present embodiment, a second pre-training process is added before fine-tuning in a model training stage, and the training is performed using paragraph matching data similar to the table matching task. Question-paragraph matching data is easier to obtain. Although it cannot be guaranteed that the data quality is as high as the labeling data, based on a large amount of noise data, the training can still enable the model to learn the target task more easily. This avoids the problem of a large amount of labor costs due to acquisition of the labeling data required for the task of matching between the question and the table.

Figure 7:
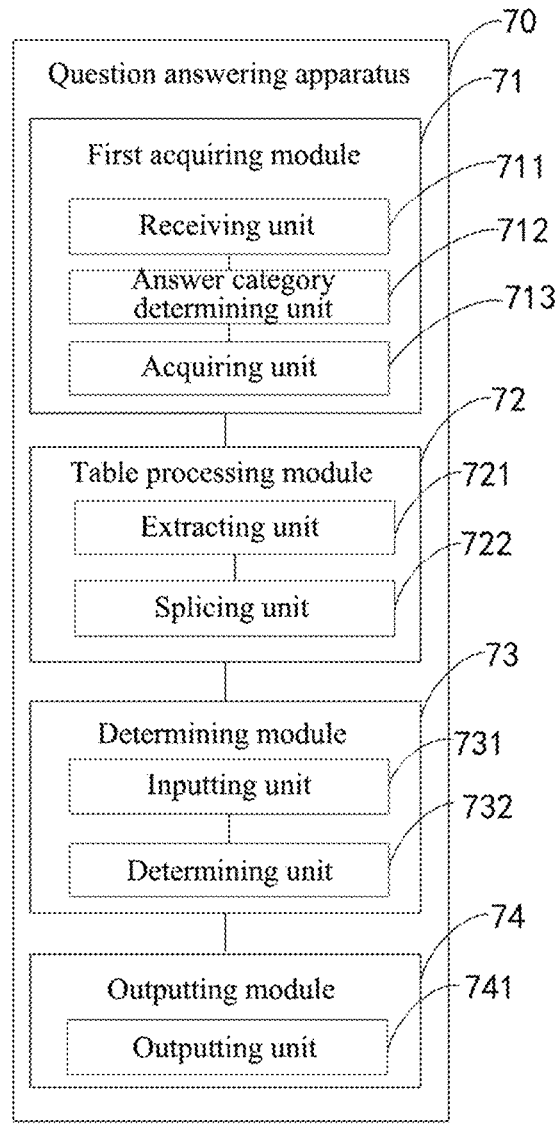
FIG. 7 is a schematic structural diagram of a question answering apparatus according to an embodiment of the present application.

FIG. 7 is a schematic structural diagram of a question answering apparatus according to an embodiment of the present application. The question answering apparatus may specifically be the terminal device in the foregoing embodiment, or a component of the terminal device (such as a chip or a circuit). The question answering apparatus provided in the embodiment of the present application may execute a processing flow provided in the question answering method embodiment, as shown in FIG. 7, the question answering apparatus 70 includes a first acquiring module 71, a table processing module 72, a determining module 73, and an outputting module 74. The first acquiring module 71 is configured to acquire at least one candidate table matching a question to be queried, where each candidate table includes a candidate answer corresponding to the question; the table processing module 72 is configured to process the at least one candidate table to obtain at least one table text, where the table text includes textual content of respective fields in the candidate table, and the fields include a title, a header and a cell; the determining module 73 is configured to input the question and each table text into a preset language model respectively to obtain a degree of matching between the question and each candidate table; and the outputting module 74 is configured to output a reply table according to the degree of matching of each candidate table, where the reply table is a candidate table out of the at least one candidate table whose degree of matching with the question is greater than a preset value or a candidate table whose degree of matching with the question is maximum.

Optionally, the table processing module 72 includes an extracting unit 721 and a splicing unit 722; where the extracting unit 721 is configured to extract the textual content of the respective fields in the at least one candidate table respectively; and the splicing unit 722 is configured to splice textual content of respective fields of each candidate table together to obtain the at least one table text.

Optionally, each word in the table text corresponds to field information, and the field information is configured to identify a field to which the word in the table text belongs in the candidate table.

Optionally, the language model includes an input layer that includes a vector coding module, a segment coding module, and a position coding module; the determining module 73 includes: an inputting unit 731, configured to input the question and each table text into the vector coding module to obtain a text vector; input the question, each table text and the field information corresponding to the table text into the segment coding module to obtain a segment vector; and input the question and each table text into the position coding module to obtain a position vector; and a determining unit 732, configured to determine the degree of matching between the question and each candidate table according to the text vector, the segment vector and the position vector.

Optionally, the determining module 73 is further configured to acquire a probability value outputted by the language model according to the question and each table text; and determine the degree of matching between the question and each candidate table according to the probability value.

Optionally, the acquiring module 71 includes: a receiving unit 711, configured to receive the question to be queried; an answer category determining unit 712, configured to determine an answer category of the question to be queried; and an acquiring unit 713, configured to, if the answer category is a target category, acquire the at least one candidate table matching the question to be queried, where the target category includes an entity and/or a number.

Optionally, there is one candidate table; where the outputting module 74 includes: an outputting unit 741, configured to determine whether the degree of matching of the candidate table is greater than or equal to a matching degree threshold; and if the degree of matching of the candidate table is greater than or equal to the matching degree threshold, output the candidate table as the reply table.

Optionally, there is one candidate table; where the outputting module 74 includes: an outputting unit 741, configured to, if the degree of matching of the candidate table is less than a matching degree threshold, output a prompt message indicating a failure to search a matched answer.

Optionally, there are at least two candidate tables; where the outputting module 74 includes: an outputting unit 741, configured to output a candidate table corresponding to a highest degree of matching as the reply table.

The question answering apparatus of the embodiment shown in FIG. 7 can be used to implement the technical solutions in the foregoing method embodiments, implementation principles and technical effects thereof are similar, and details will not be described here again.

An embodiment of the present application allows for: acquiring at least one candidate table matching a question to be queried, where each candidate table includes a candidate answer corresponding to the question; processing the at least one candidate table to obtain at least one table text, where the table text includes textual content of respective fields in the candidate table, and the fields include a title, a header and a cell; inputting the question and each table text into a preset language model respectively to obtain a degree of matching between the question and each candidate table; and outputting a reply table according to the degree of matching of each candidate table, where the reply table is a candidate table out of the at least one candidate table whose degree of matching with the question is greater than a preset value or a candidate table whose degree of matching with the question is maximum. Since the language model can carry out semantic comprehension of a question and a text, in the process of determining the degree of matching between the question and the candidate table, they two are matched based on a semantic comprehension result, thereby improving the accuracy and recall rate of matching between the question and the table. In addition, the answer is finally presented to users in the form of table, which has good visualization for the users and thus can improve user experience.

Figure 8:
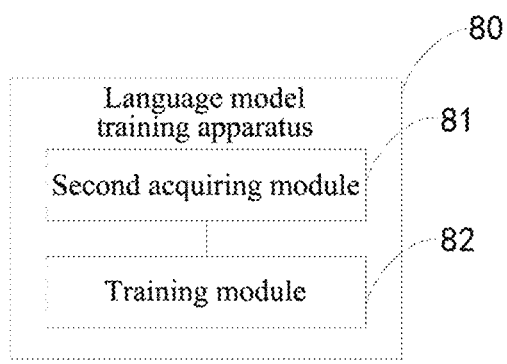
FIG. 8 is a schematic structural diagram of a language model training apparatus according to an embodiment of the present application.

FIG. 8 is a schematic structural diagram of a language model training apparatus according to an embodiment of the present application. The language model training apparatus may specifically be the terminal device in the foregoing embodiment, or a component of the terminal device (such as a chip or a circuit). The language model training apparatus provided in the embodiment of the present application may execute a processing flow provided in the language model training method embodiment, as shown in FIG. 8, the language model training apparatus 80 includes a second acquiring module 81 and a training module 82. The second acquiring module 81 is configured to acquire first training sample data, where the first training sample data is textual data without labeling information; and acquire second training sample data and labeling information corresponding thereto, where the second training sample data includes a question and multiple candidate tables corresponding to the question, and the labeling information is configured to indicate a correlation between the question and each candidate table; and the training module 82 is configured to perform, based on the first training sample data, first pre-training on a model to be trained to obtain a first pre-training model; and train the first pre-training model based on the second training sample data and the labeling information corresponding thereto to obtain a language model, where the language model is configured to determine a degree of matching between the question and at least one candidate table.

Optionally, the second acquiring module 81 is further configured to acquire third training sample data and labeling information corresponding thereto, where the third training sample data includes a question and multiple textual answers corresponding to the question, the labeling information of the third training sample data is configured to indicate a correlation between the question and the multiple textual answers with labeling information of each textual answer having a different degree of accuracy, and the third training sample data and the second training sample data have a same training task corresponding thereto; and the training module 82 is further configured to train the first pre-training model based on the third training sample data and the labeling information corresponding thereto to obtain a retrained first pre-training model.

The language model training apparatus of the embodiment shown in FIG. 8 can be used to implement the technical solutions in the foregoing method embodiments, implementation principles and technical effects thereof are similar, and details will not be described here again.

An embodiment of the present application allows for: acquiring at least one candidate table matching a question to be queried, where each candidate table includes a candidate answer corresponding to the question; processing the at least one candidate table to obtain at least one table text, where the table text includes textual content of respective fields in the candidate table, and the fields include a title, a header and a cell; inputting the question and each table text into a preset language model respectively to obtain a degree of matching between the question and each candidate table; and outputting a reply table according to the degree of matching of each candidate table, where the reply table is a candidate table out of the at least one candidate table whose degree of matching with the question is greater than a preset value or a candidate table whose degree of matching with the question is maximum. Since the language model can carry out semantic comprehension of a question and a text, in the process of determining the degree of matching between the question and the candidate table, they two are matched based on a semantic comprehension result, thereby improving the accuracy and recall rate of matching between the question and the table. In addition, the answer is finally presented to users in the form of table, which has good visualization for the users and thus can improve user experience.

According to an embodiment of the present application, the present application further provides an electronic device and a readable storage medium.

Figure 9:
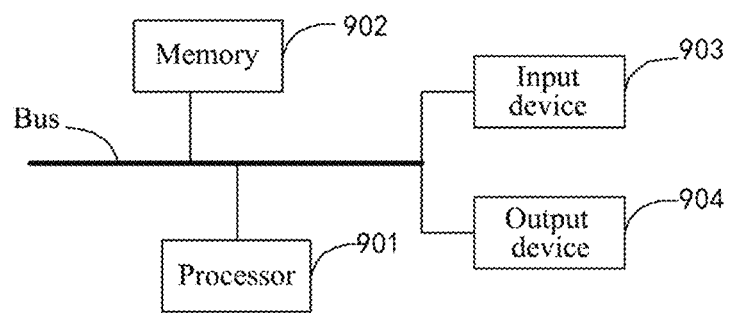
FIG. 9 is a block diagram of an electronic device for implementing the question answering method and/or the language model training method according to an embodiment of the present application.

As shown in FIG. 9, it is a block diagram of an electronic device for the question answering method and/or the language model training method according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components shown herein, their connections and relationships, and their functions are merely examples, and are not intended to limit implementations of the present application described and/or claimed herein.

As shown in FIG. 9, the electronic device includes: one or more processors 901, a memory 902, and an interface for connecting components, including a high-speed interface and a low-speed interface. The components are connected to each other via different buses, and can be installed on a public motherboard or installed in other ways as desired. The processor may process instructions executed within the electronic device, including instructions that stored in or on the memory to display GUI graphical information on an external input/output device (such as a display device coupled to the interface). In other embodiments, multiple processors and/or multiple buses can be used together with multiple memories, if desired. Similarly, multiple electronic devices can be connected, and each device provides some necessary operations (for example, as a server array, a group of blade servers, or a multi-processor system). In FIG. 9, one processor 901 is used as an example.

The memory 902 is a non-transitory computer readable storage medium provided in the present application. The memory is stored with instructions executable by at least one processor, enabling at least one processor to execute the question answering method and/or the language model training method provided in the present application. The non-transitory computer readable storage medium of the present application is stored with computer instructions, which are configured to enable a computer to execute the question answering method and/or the language model training method provided in the present application.

As a kind of non-transitory computer readable storage medium, the memory 902 may be configured to store non-transitory software programs, non-transitory computer executable programs and modules, such as program instructions/modules corresponding to the question answering method and/or the language model training method in the embodiments of the present application (for example, the first acquiring module 71, the table processing module 72, the determining module 73 and the outputting module 74 shown in FIG. 7). The processor 901 executes various functional applications and data processing of the server by running the non-transitory software programs, instructions, and modules stored in the memory 902, thereby implementing the question answering method and/or the language model training method in the foregoing method embodiments.

The memory 902 may include a program storage area and a data storage area, where the program storage area may be stored with an application program required by an operating system and at least one function, the data storage area may be stored with data created according to use of the electronic device for the question answering method and/or the language model training method, and the like. In addition, the memory 902 may include a high-speed random access memory, and may also include a non-transitory memory, such as at least one magnetic disk storage device, a flash memory device, or other non-transitory solid-state storage devices. In some embodiments, the memory 902 optionally includes remote memories arranged relative to the processor 901, and these remote memories can be connected to the electronic device for the question answering method and/or the language model training method through a network. Examples of the above network include, but are not limited to, Internet, an intranet, a local area network, a mobile communication network, and a combination thereof.

The electronic device for the question answering method and/or the language model training method may also include: an input device 903 and an output device 904. The processor 901, the memory 902, the input device 903 and the output device 904 can be connected by a bus or in other ways, in FIG. 9, connections via buses are used as an example.

The input device 903 may receive input digital or character information, and generate key signal input related to user settings and function control of the electronic device for the question answering method and/or the language model training method, such as a touch screen, a keypad, a mouse, a trackpad, a touchpad, an indicator bar, one or more mouse buttons, a trackball, a joystick and other input devices. The output device 904 may include a display device, an auxiliary lighting device (e. g., an LED), a tactile feedback device (e. g., a vibration motor), and the like. The display device may include, but is not limited to, a liquid crystal display (LCD), a light emitting diode (LED) display, and a plasma display. In some implementations, the display device may be the touch screen.

Various implementations of the system and the technique described herein may be implemented in a digital electronic circuit system, an integrated circuit system, an ASIC (application specific integrated circuit), a computer hardware, a firmware, a software, and/or a combination thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input device and at least one output device, and transmit the data and the instructions to the storage system, the at least one input device and the at least one output device.

These computer programs (also known as programs, software, software applications, or codes) include machine instructions of the programmable processor, and may be implemented using a high-level process and/or an object-oriented programming language, and/or an assembly/machine language. As used herein, the terms such as "machine readable medium" and "computer readable medium" refer to any computer program product, device, and/or equipment (e.g., a magnetic disk, an optical disk, a memory, a programmable logic device (PLD)) configured to provide machine instructions and/or data to the programmable processor, including a machine readable medium that receives machine instructions as machine readable signals. The term "machine readable signal" refers to any signal configured to provide machine instructions and/or data to the programmable processor.

For provision of interaction with a user, the system and the technique described herein may be implemented on a computer, and the computer has: a display device for displaying information to the user (such as a CRT (cathode ray tube) or an LCD (liquid crystal display) monitor); and a keyboard and a pointing device (such as a mouse or a trackball), the user may provide an input to the computer through the keyboard and the pointing device. Other kinds of devices may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computing system may include a client and a server. The client and the server are generally far away from each other, and generally interact with each other through the communication network. A relationship between the client and the server is generated by computer programs running on a corresponding computer and having a client-server relationship.

It should be noted that the question answering apparatus and the language model training apparatus in the present embodiments may be implemented by the same electronic device or different electronic devices.

The technical solutions according to the embodiments of the present application allow for: acquiring at least one candidate table matching a question to be queried, where each candidate table includes a candidate answer corresponding to the question; processing the at least one candidate table to obtain at least one table text, where the table text includes textual content of respective fields in the candidate table, and the fields include a title, a header and a cell; inputting the question and each table text into a preset language model respectively to obtain a degree of matching between the question and each candidate table; and outputting a reply table according to the degree of matching of each candidate table, where the reply table is a candidate table out of the at least one candidate table whose degree of matching with the question is greater than a preset value or a candidate table whose degree of matching with the question is maximum. Since the language model can carry out semantic comprehension of a question and a text, in the process of determining the degree of matching between the question and the candidate table, they two are matched based on a semantic comprehension result, thereby improving the accuracy and recall rate of matching between the question and the table. In addition, the answer is finally presented to users in the form of table, which has good visualization for the users and thus can improve user experience.

It should be understood that the various forms of processes shown above can be used, and reordering, addition, or deletion of a step can be performed. For example, the steps recorded in the present application can be executed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement made within the spirit and principle of the present application shall be included in the protection scope of the present application.

What is claimed is:

1. A question answering method, comprising:
    acquiring at least one candidate table matching a question to be queried, wherein each candidate table comprises a candidate answer corresponding to the question;
    processing the at least one candidate table to obtain at least one table text, wherein the table text comprises textual content of respective fields in the candidate table, and the fields comprise a title, a header and a cell;
    inputting the question and each table text into a preset language model respectively to obtain a degree of matching between the question and each candidate table; and
    outputting a reply table according to the degree of matching of each candidate table, wherein the reply table is a candidate table out of the at least one candidate table whose degree of matching with the question is greater than a preset value or a candidate table whose degree of matching with the question is maximum;
    wherein the acquiring the at least one candidate table matching the question to be queried comprises:
    receiving the question to be queried;
    determining an answer category of the question to be queried, wherein the answer category comprises a target category indicating an exact answer, a category indicating a selective answer and a category indicating an interrogative answer; and
    acquiring the at least one candidate table matching the question to be queried upon determining that the answer category is the target category indicating the exact answer, wherein the target category comprises at least one of an entity or a number;
    wherein the processing the at least one candidate table to obtain the at least one table text comprises:
    extracting the textual content of the respective fields in the at least one candidate table respectively; and
    splicing the textual content of respective fields of each candidate table together to obtain the at least one table text.

2. The method according to claim 1, wherein each word in the table text corresponds to field information, and the field information is configured to identify a field to which the word in the table text belongs in the candidate table.

3. The method according to claim 2, wherein the language model comprises an input layer that comprises a vector coding module, a segment coding module, and a position coding module;
    the inputting the question and each table text into the preset language model respectively to obtain the degree of matching between the question and each candidate table comprises:
    inputting the question and each table text into the vector coding module to obtain a text vector;
    inputting the question, each table text and the field information corresponding to the table text into the segment coding module to obtain a segment vector;
    inputting the question and each table text into the position coding module to obtain a position vector; and
    determining the degree of matching between the question and each candidate table according to the text vector, the segment vector and the position vector.

4. The method according to claim 1, wherein the inputting the question and each table text into the preset language model respectively to obtain the degree of matching between the question and each candidate table comprises:
    acquiring a probability value outputted by the language model according to the question and each table text; and
    determining the degree of matching between the question and each candidate table according to the probability value.

5. The method according to claim 1, wherein there is one candidate table; wherein the outputting the reply table according to the degree of matching of each candidate table comprises:
    determining whether the degree of matching of the candidate table is greater than or equal to a matching degree threshold; and
    if the degree of matching of the candidate table is greater than or equal to the matching degree threshold, outputting the candidate table as the reply table.

6. The method according to claim 1, wherein there is one candidate table; wherein the outputting the reply table according to the degree of matching of each candidate table comprises:
    if the degree of matching of the candidate table is less than a matching degree threshold, outputting a prompt message indicating a failure to search a matched answer.

7. The method according to claim 1, wherein there are at least two candidate tables;
    wherein the outputting the reply table according to the degree of matching of each candidate table comprises:
    outputting a candidate table corresponding to a highest degree of matching as the reply table.

8. A question answering apparatus, comprising:
    at least one processor; and
    a memory communicatively connected to the at least one processor;

wherein the memory is stored with an instruction executable by the at least one processor, and the instruction is executed by the at least one processor to enable the at least one processor to:

acquire at least one candidate table matching a question to be queried, wherein each candidate table comprises a candidate answer corresponding to the question;

process the at least one candidate table to obtain at least one table text, wherein the table text comprises textual content of respective fields in the candidate table, and the fields comprise a title, a header and a cell;

input the question and each table text into a preset language model respectively to obtain a degree of matching between the question and each candidate table; and output a reply table according to the degree of matching of each candidate table, wherein the reply table is a candidate table out of the at least one candidate table whose degree of matching with the question is greater than a preset value or a candidate table whose degree of matching with the question is maximum;

wherein the instruction is executed by the at least one processor to enable the at least one processor to:

receive the question to be queried;

determine an answer category of the question to be queried, wherein the answer category comprises a target category indicating an exact answer, a category indicating a selective answer and a category indicating an interrogative answer; and acquire the at least one candidate table matching the question to be queried upon determining that the answer category is the target category indicating the exact answer, wherein the target category comprises at least one of an entity or a number;

wherein the instruction is executed by the at least one processor to enable the at least one processor to:

extract the textual content of the respective field in the at least one candidate table respectively; and splice the textual content of respective fields of each candidate table together to obtain the at least one table text.

9. The apparatus according to claim 8, wherein each word in the table text corresponds to field information, and the field information is configured to identify a field to which the word in the table text belongs in the candidate table.

10. The apparatus according to claim 9, wherein the language model comprises an input layer that comprises a vector coding module, a segment coding module, and a position coding module;

the instruction is executed by the at least one processor to enable the at least one processor to:

input the question and each table text into the vector coding module to obtain a text vector; input the question, each table text and the field information corresponding to the table text into the segment coding module to obtain a segment vector; and input the question and each table text into the position coding module to obtain a position vector; and determine the degree of matching between the question and each candidate table according to the text vector, the segment vector and the position vector.

11. The apparatus according to claim 8, wherein the instruction is executed by the at least one processor to enable the at least one processor to:

acquire a probability value outputted by the language model according to the question and each table text; and determine the degree of matching between the question and each candidate table according to the probability value.

12. The apparatus according to claim 8, wherein there is one candidate table; wherein the instruction is executed by the at least one processor to enable the at least one processor to:

determine whether the degree of matching of the candidate table is greater than or equal to a matching degree threshold; and if the degree of matching of the candidate table is greater than or equal to the matching degree threshold, output the candidate table as the reply table.

13. The apparatus according to claim 8, wherein there is one candidate table; wherein the instruction is executed by the at least one processor to enable the at least one processor to:

if the degree of matching of the candidate table is less than a matching degree threshold, output a prompt message indicating a failure to search a matched answer.

14. The apparatus according to claim 8, wherein there are at least two candidate tables;

wherein the instruction is executed by the at least one processor to enable the at least one processor to:

output a candidate table corresponding to a highest degree of matching as the reply table.

* * * * *